(12) United States Patent
Oh (10) Patent No.: US 7,559,577 B2
(45) Date of Patent: Jul. 14, 2009

(54) IMPACT ABSORPTION STEERING APPARATUS

(75) Inventor: Jae-Moon Oh, Gongju-si (KR)

(73) Assignee: Mando Corporation (KR)

( * ) Notice: Subject to any disclaimer, the term of this patent is extended or adjusted under 35 U.S.C. 154(b) by 0 days.

(21) Appl. No.: 12/075,431

(22) Filed: Mar. 11, 2008

(65) Prior Publication Data

US 2008/0224459 A1 Sep. 18, 2008

(30) Foreign Application Priority Data

Mar. 16, 2007 (KR) .................. 10-2007-0026010
Apr. 6, 2007 (KR) .................. 10-2007-0034330

(51) Int. Cl.
*B62D 1/00* (2006.01)
(52) U.S. Cl. ..................................... 280/777
(58) Field of Classification Search .......... 280/777, 280/775, 779; 74/493
See application file for complete search history.

(56) References Cited

U.S. PATENT DOCUMENTS

| 5,390,955 | A | * | 2/1995 | Kaliszewski et al. | ........ 280/777 |
| 6,761,376 | B2 | * | 7/2004 | Riefe et al. | .................. 280/777 |
| 2008/0238071 | A1 | * | 10/2008 | Oh | .............................. 280/777 |

* cited by examiner

*Primary Examiner*—Faye M. Fleming
(74) *Attorney, Agent, or Firm*—Harness, Dickey & Pierce, P.L.C.

(57) ABSTRACT

Disclosed is an impact absorption steering apparatus, which includes: a mounting bracket for supporting an outer tube so as to fix the outer tube in a chassis of a vehicle; and a plate bracket which has one opened side and another side assembled with the mounting bracket, the plate bracket enclosing the outer tube, wherein the plate bracket is fixedly assembled with the mounting bracket, at least one protuberance is formed at an inner side of a guide part of the mounting bracket, and at least one groove is formed at each end of both sides of the plate bracket in such a manner that the groove corresponds to the protuberance.

14 Claims, 14 Drawing Sheets

IMPACT ABSORPTION STEERING APPARATUS

CROSS-REFERENCE TO RELATED APPLICATION

This non-provisional application claims priority under 35 U.S.C § 119(a) on Patent Application No. 10-2007-0034330 filed in Korea on Apr. 6, 2007 And Patent Application No. 10-2007-0026010 filed in Korea on Mar. 16, 2007, the entire contents of which are hereby incorporated by reference.

BACKGROUND OF THE INVENTION

1. Field of the invention

The present invention relates to an impact absorption steering apparatus, and more particularly to an impact absorption steering apparatus, in which a groove or a protuberance is formed at a mounting bracket and a plate bracket, respectively, instead of a capsule and a tearing plate used as an impact absorption apparatus of a conventional steering column, and then the protuberance is forcibly inserted and fixed in the groove, so as to absorb load due to collision through relative movement between the groove and the protuberance when impact energy is exerted to the steering column, thereby reducing manufacturing cost and manufacturing processes.

2. Description of the Prior Art

In general, a steering column is an apparatus which encloses and supports a steering shaft transferring rotational force generated by a steering wheel operated by a driver to a rack-pinion mechanism, and is fixed to a chassis of a vehicle through a bracket, so as to fix a position of the steering shaft.

When a vehicle crashes against an object, the upper part of a driver's body hits against the steering wheel and gets injured. In order to prevent this, an impact absorption steering column, which has a collapse function allowing a steering column and a steering shaft to be contracted in its shaft direction, has been employed as a steering column. Particularly, when a collision accident occurs during the driving, the upper body of the driver bumps against the steering wheel due to inertia. Therefore, as the upper body of the driver bumps against the steering wheel, the steering column and the steering shaft, which are disposed at the upper part of the vehicle, are contracted so as to reduce the impact exerted on the driver.

However, the collision energy transferred to the steering wheel due to the collision between the steering wheel and the driver depends on a driver state and a vehicle state. For example, large collision energy is transferred when the vehicle has a high speed, while small collision energy is transferred when the vehicle has a low speed. Further, the amount of the collision energy applied to the steering wheel depends on several conditions such as the wearing of driver's seat belt, operation of an air bag, etc. A steering apparatus equipped with a tearing plate has been developed to cope with these conditions.

Figure 1:
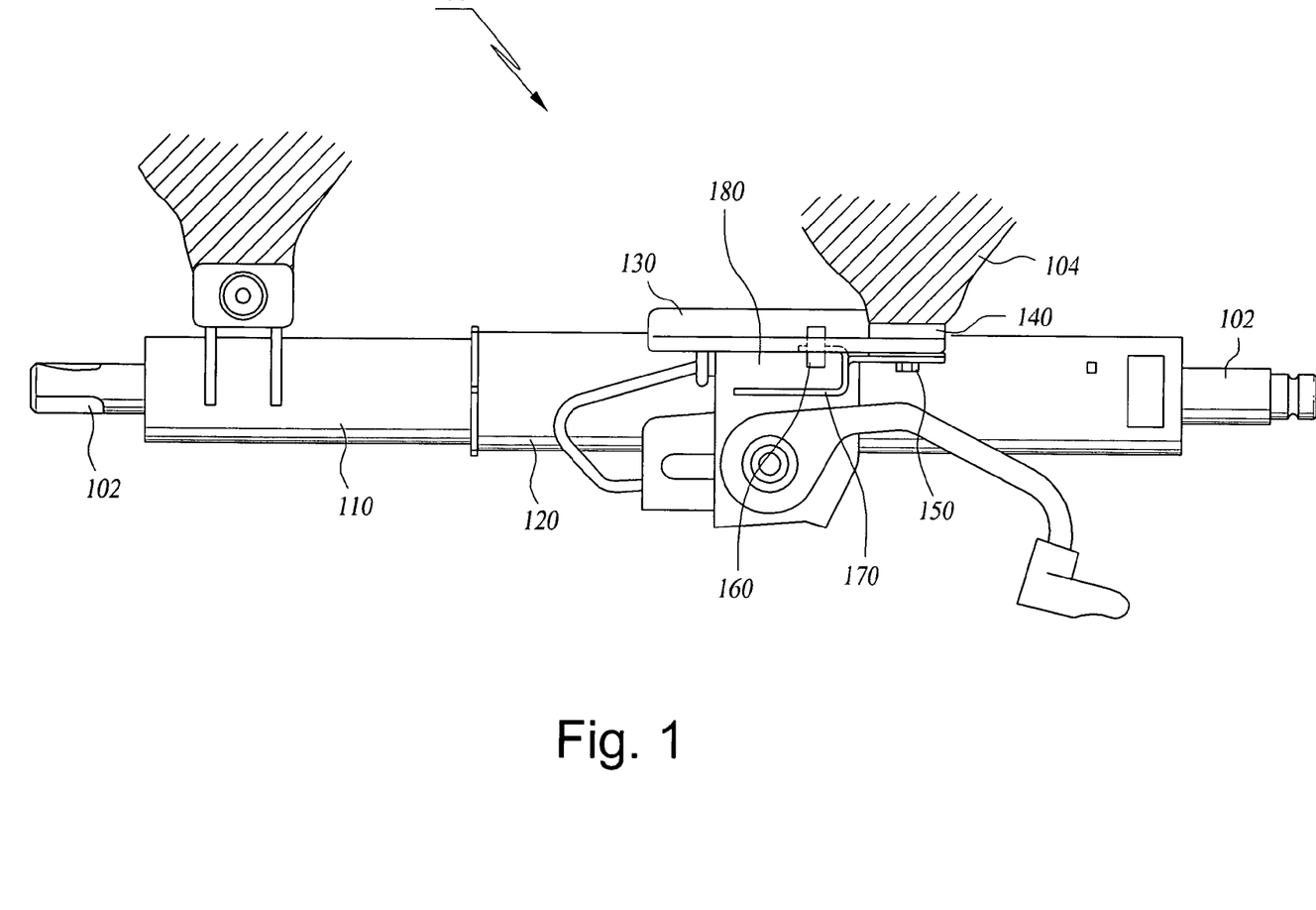
FIG. 1 is a side view of a conventional impact absorption steering column of a vehicle.

FIG. 1 is a side view illustrating a conventional impact absorption steering column of a vehicle. As shown in FIG. 1, the conventional impact absorption steering column 100 includes: a steering shaft 102 having an upper end connected with a steering wheel (now shown) and a lower end connected with the rack-pinion mechanism (not shown); an inner tube 100 surrounding the steering shaft 102, an outer tube 120 surrounding the inner tube 10; a mounting bracket 130 which supports an outer circumferential surface of the outer tube 120 and is assembled with a chassis 104 of a vehicular through a capsule 140; a tearing plate 170 which has one end fixed in the capsule 140 by a fixing means and the other end fixed in the mounting bracket 130 by a fixing member 150; and a plate bracket 180 which encloses the outer tube 120 and has one side opened and the other side assembled with the mounting bracket 130.

When the upper part of driver's body collides with the steering wheel due to a frontal crashing of a vehicle, the steering column 100 is contracted in the direction (i.e. a collision energy transfer direction or a collapse direction) in which the impact has been applied to the steering wheel. Then, the mounting bracket 130 moves together with the exterior tube 120 in the collapse direction from the capsule 140 fixed on the chassis.

That is, when the collision occurs, the mounting bracket 130 is released from the capsule 140, and is easily released from the chassis 104, and then moves in the collapse direction (i.e. in the collision energy transfer direction), which the steering column 100 is contracted.

Also, in a case where the steering column 100 is contracted so as to allow the mounting bracket 130 and the capsule 140 to perform each relative movement so that the mounting bracket 130 moves downward, the tearing plate 170 receives forces, of which directions are opposite to each other, from the capsule 140 and the mounting bracket 130, respectively, so that the fixing member 160 included in the mounting bracket 130 changes the shape of the tearing plate 170, thereby absorbing impact energy.

Such a conventional impact absorption steering column employs a capsule and a tearing plate so as to absorb impact exerted when it collapses. Therefore, manufacturing cost is higher, and manufacturing processes also increase so that time required for manufacturing it is longer.

SUMMARY OF THE INVENTION

Accordingly, the present invention has been made to solve the above-mentioned problems occurring in the prior art, and the present invention provides an impact absorption steering apparatus, in which a groove or a protuberance is formed at a mounting bracket and a plate bracket, respectively, instead of a capsule and a tearing plate used as an impact absorption device of a conventional steering column, and then the protuberance is forcibly inserted into the groove so as to be fixed so that load due to clash is absorbed through relative movement between the groove and the protuberance when impact energy is exerted to the steering column.

In accordance with an aspect of the present invention, there is provided an impact absorption steering apparatus, which includes: a mounting bracket for supporting an outer tube so as to fix the outer tube in a chassis of a vehicle; and a plate bracket which has one opened side and another side assembled with the mounting bracket, the plate bracket enclosing the outer tube, wherein the plate bracket is fixedly assembled with the mounting bracket, at least one protuberance is formed at an inner side of a guide part of the mounting bracket, and at least one groove is formed at each end of both sides of the plate bracket in such a manner that the groove corresponds to the protuberance.

Also, present invention provides an impact absorption steering apparatus, which includes: a mounting bracket for supporting an outer tube so as to fix the outer tube in a chassis of a vehicle; and a plate bracket which has one opened side and another side assembled with the mounting bracket, the plate bracket enclosing the outer tube, wherein the plate bracket is fixedly assembled with the mounting bracket, at least one protuberance is formed at each end of both sides of the plate bracket, and at least one groove is formed at an inner side of a guide part of the mounting bracket in such a manner that the groove corresponds to the protuberance.

Also, the present invention provides an impact absorption steering apparatus, in which at least one protuberance is formed at an inner side of a guide part of the mounting bracket, and at least one groove is formed at each end of both sides of the plate bracket in such a manner that the groove corresponds to the protuberance, the impact absorbing steering apparatus including at least one first molding groove formed in such a manner that the first molding groove extends through the protuberance, a second molding groove formed at the groove in such a manner that the second molding groove corresponds to the first molding groove, and a molding member filled in the first molding groove and the second molding groove.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings. In the following description and drawings, the same reference numerals are used to designate the same or similar components, and so repetition of the description on the same or similar components will be omitted.

Figure 2A:
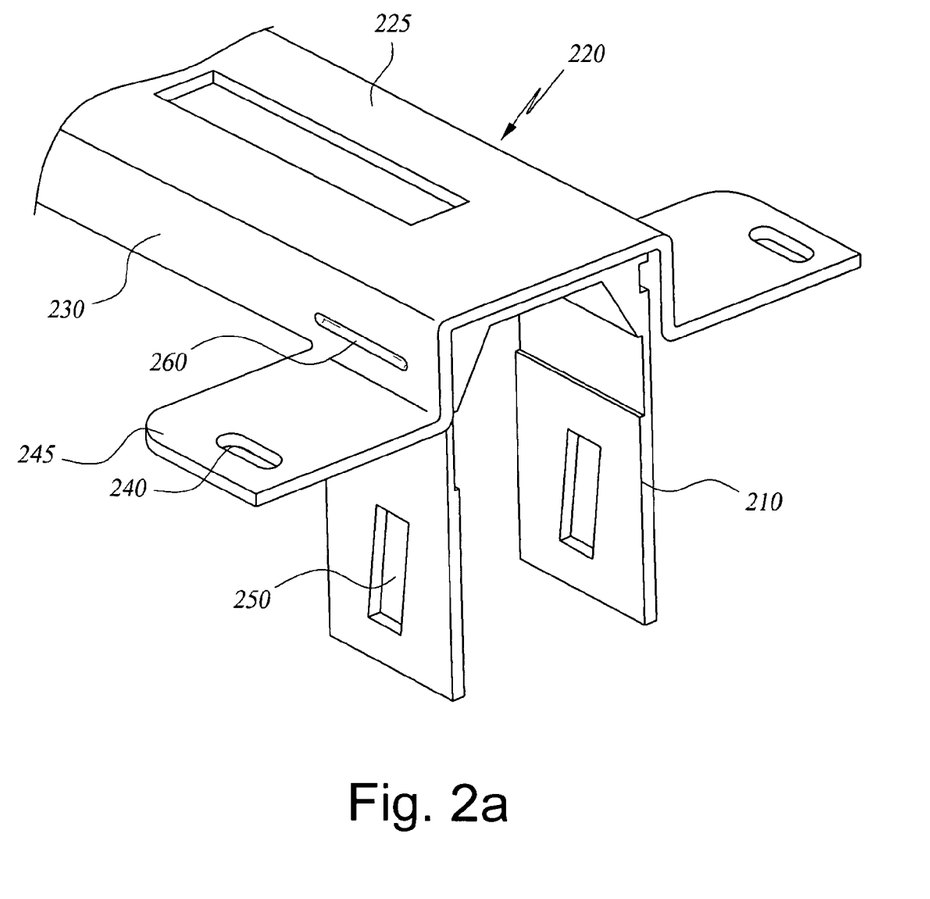
FIG. 2a is a perspective view of a part of an assembly where a mounting bracket and a plate bracket according to an embodiment of the present invention are assembled with each other.
Figure 2B:
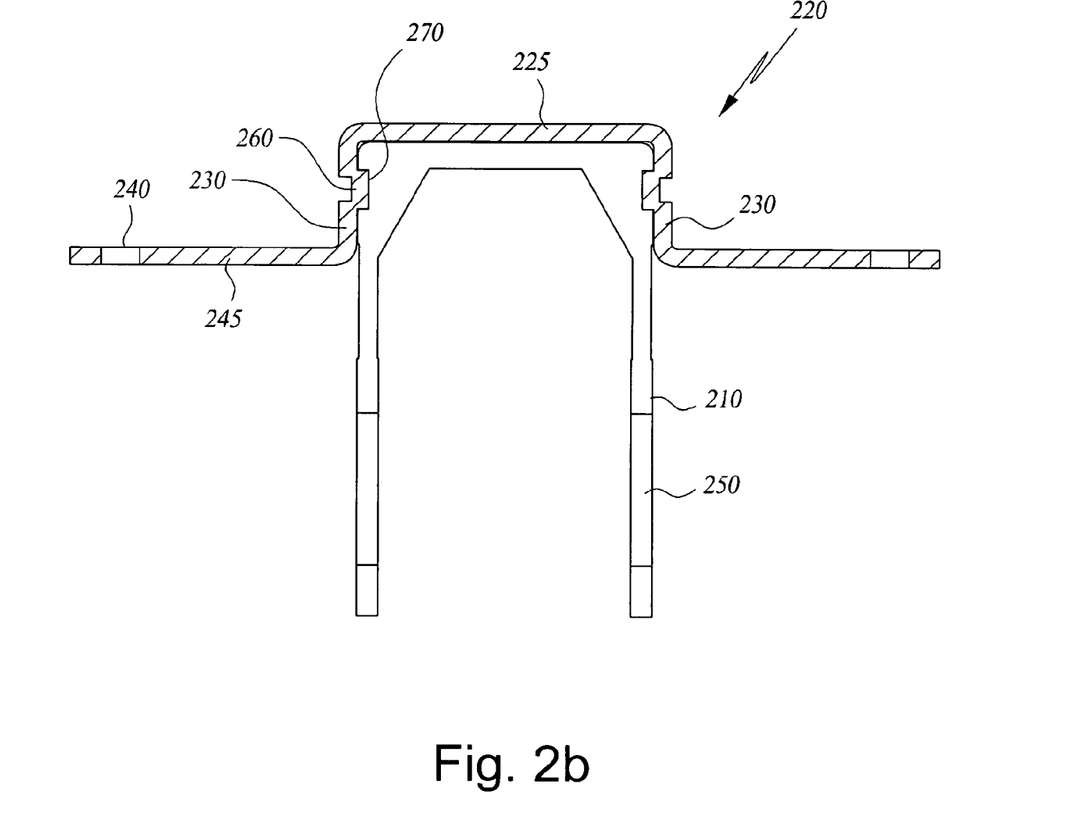
FIG. 2b is a sectional view of a structure where a mounting bracket and a plate bracket according to the first, second, and third embodiments of the present invention are assembled with each other.

FIG. 2a is a perspective view of a part of an assembly where a mounting bracket and a plate bracket according to an embodiment of the present invention are assembled with each other, and FIG. 2b is a sectional view of a structure where a mounting bracket and a plate bracket according to the first, second, and third embodiments of the present invention are assembled with each other. As shown in FIGS. 2a and 2b, the first embodiment includes: a first mounting bracket 220 supporting an outer tube 120 so as to fix it to a chassis of a vehicle; a first plate bracket 210 which encloses the outer tube 120 and has one side opened and the other side assembled with the first mounting bracket 220; each first protuberance 260 formed at each inner surface of guide parts 230 of the first mounting bracket 220; and each first groove 270 formed at both ends of the first plate bracket 210 in such a manner that the first groove 270 corresponds to the first protuberance 260.

The first mounting bracket 220 supports the outer tube 120 so as to fix it in the chassis. A fixing groove 240 is formed at wing parts 245 disposed at both sides of the first mounting bracket 220 fixing groove 240 so that the first mounting bracket 220 is assembled with the vehicular in such a manner that an assembling member extends trough the fixing groove 240.

A body part 225 of the first mounting bracket 220 has a "U" shape and has the guide parts 230, which is longitudinally formed at both sides thereof, and is integrally formed at the wing parts 245 disposed at each end of the guide parts 230.

The first protuberance 260 is longitudinally formed at the inner surface of the guide part 230 so as to be engaged with the first groove 270 formed at both ends of the first plate bracket 210.

Although the length of the first protuberance 260 is smaller than the width of each wing part 245 in illustration of an embodiment of the present invention, the length of the first protuberance 260 may be longer than the width of each wing part 245 according to the absorption amount of the load due to clash.

The first plate bracket 210 encloses the outer tube 120 and has one opened side and the other side assembled with the first mounting bracket 220.

Herein, the first plate bracket 210 is assembled with the first mounting bracket 220 in such a manner that the first groove 270 and the first protuberance 260 are forcibly engaged with each other.

Tilt elongated holes 250 are formed at the first plate bracket 210 so as to allow a tilt operation of the steering column 100 (see FIG. 1) to be performed, and each first groove 270 is formed at both sides of at the first plate bracket 210 so as to corresponding to each first protuberance 260 formed at the first mounting bracket 220.

Each first protuberance 260 formed at a first mounting bracket 220 is forcibly engaged with each first groove 270 formed at the first plate bracket 210. Therefore, when the first plate bracket 210 collapses along each guide part 230 of the first mounting bracket 220, the first plate bracket 210 absorbs the load due to collision.

Figure 3A:
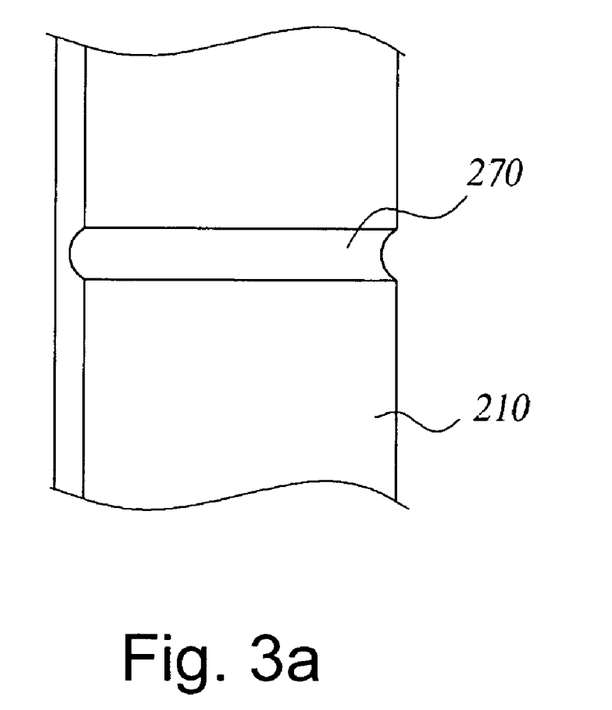
FIG. 3a is a perspective view of a first groove formed at a plate bracket according to the first and second embodiments of the present invention.
Figure 3B:
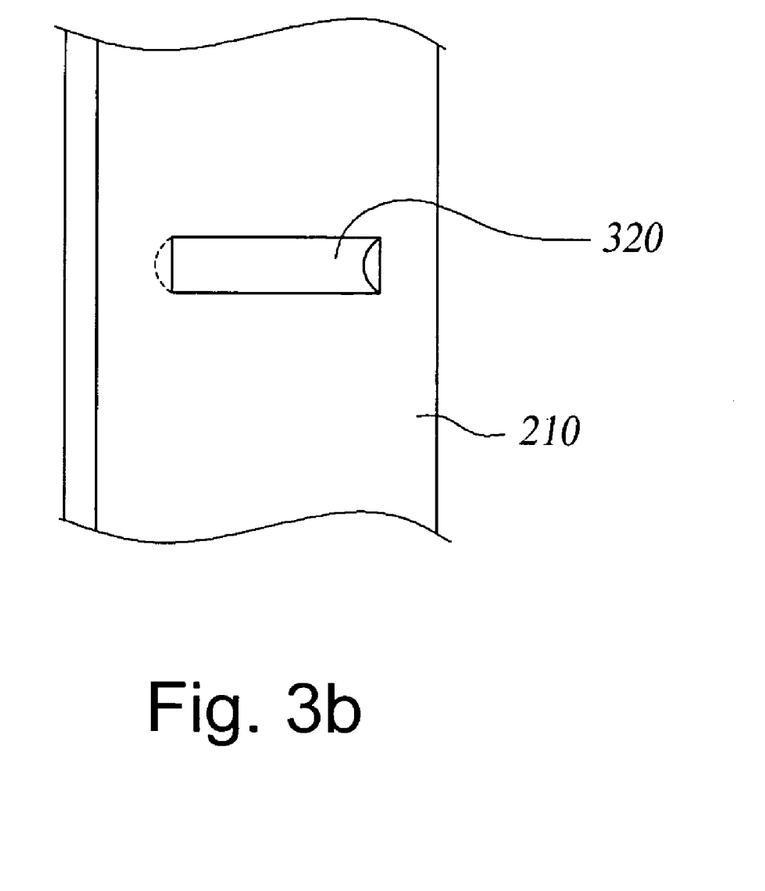
FIG. 3b is a perspective view of a second groove formed at a plate bracket according to the third embodiment of the present invention.
Figure 3C:
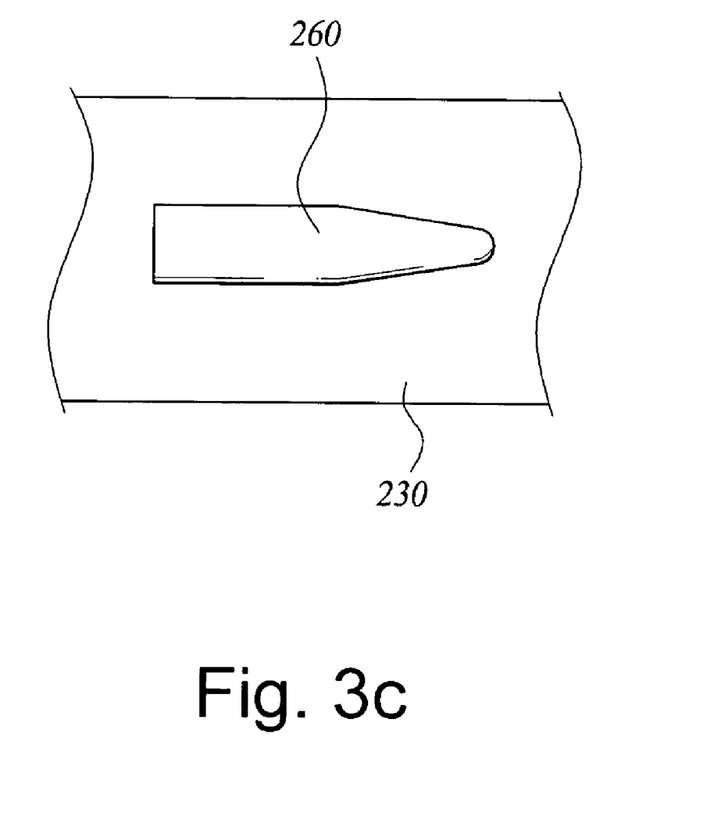
FIG. 3c is a perspective view of a first protuberance formed at an inner surface of a mounting bracket according to the first embodiment of the present invention.
Figure 3D:
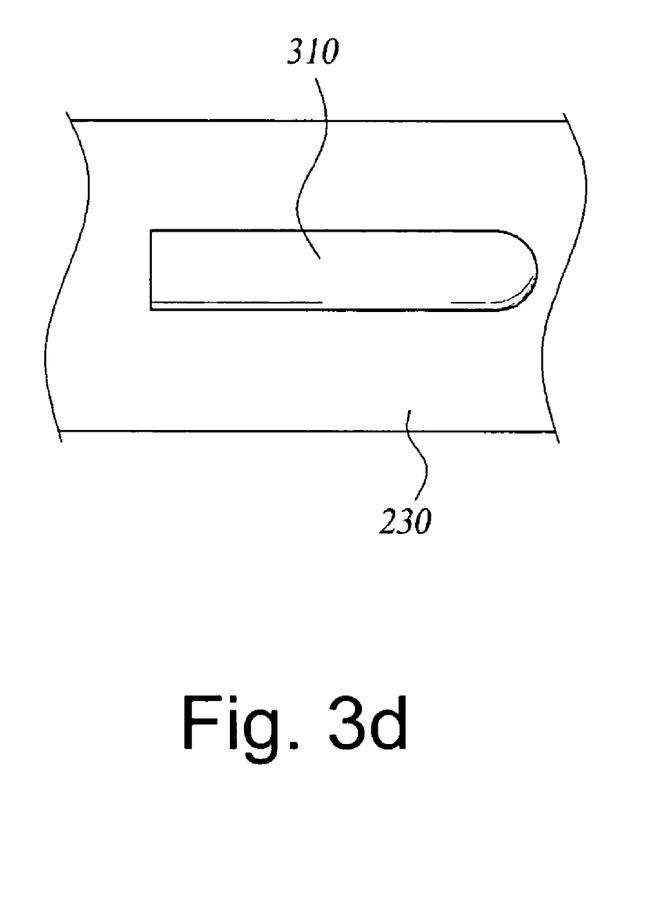
FIG. 3d is a perspective view of a second protuberance formed at an inner surface of a mounting bracket according to the second embodiment of the present invention.

FIG. 3a is a perspective view illustrating a first groove formed at the plate bracket according to the first and second embodiments of the present invention, FIG. 3b is a perspective view illustrating a second groove formed at the plate bracket according to the third embodiment of the present invention, FIG. 3c is a perspective view illustrating the first protuberance formed at an inner surface of the mounting bracket according to the first embodiment of the present invention, and FIG. 3d is a perspective view illustrating a second protuberance formed at an inner surface of the mounting bracket according to the second and third embodiments of the present invention. As shown in FIGS. 3a, 3b, 3c, and 3d, a first groove 270 or a second groove 320 is formed at the first plate bracket 210. The first protuberance 260 or a second protuberance 310 may be formed at the first mounting bracket 220.

The first groove 270 is formed at each end of both sides of the first plate bracket 210. When the first plate bracket 210 collapses, the first plate bracket 210 has to absorb the load due to collision while moving along the guide parts 230 of the first mounting bracket 220. Therefore, it is preferable that the first groove 270 has both ends opened so as to move along the first protuberance 260 or the second protuberance 310 (Particularly, the length of the first groove 270 is equal to the width of the first plate bracket 210)

Also, the first protuberance 260 or the second protuberance 310 is forcibly engaged with the first groove 270 so that, preferably, width of the first groove 270 is smaller than the maximized width of the first protuberance 260 and the width of the second protuberance 310.

The first protuberance 260 according to the first embodiment of the present invention is formed in such a manner that a part having a uniform width and a predetermined depth is continuously formed, and then the width thereof decreases. Also, it is possible that the first protuberance 260 is formed in such a manner that width thereof decreases from one side to the other side without a part continuously formed while having a uniform width and a predetermined depth.

Herein, the part having the uniform width is necessarily bigger in comparison with the width of the first groove 270 so as to be forcibly engaged with the first groove 270.

In a case where the first protuberance 260 is formed as described above, when the steering column collapses, load due to collision is absorbed by friction generated between the first groove 270 and the first protuberance 260 while the part having a uniform width moves along the first groove 270. After this, when the first groove 270 escapes from the part having a uniform width of the first protuberance 260, the first groove 270 can freely move so that collapse of the steering column is smoothly achieved.

It is preferable that the length of the part, which is continuously formed while having a uniformy width and a predetermined length, of the first protuberance 260 is properly selected according to the load due to collision to be absorbed when the steering column collapses.

Particularly, as the length of the part, which is continuously formed while having a uniform width and a predetermined length, of the first protuberance 260 is longer, the amount of the load due to collision to be absorbed when the steering column collapses is larger.

According to the third embodiment of the present invention, the second groove 320 can be formed at both ends of the first plate bracket 210. The second groove 320 has a width smaller than the width of the first plate bracket 210 as shown in FIG. 3b.

Herein, it is preferable that the shape of the protuberance engaged with the second groove 320 is the same as the shape of the second protuberance 310 as shown in FIG. 3c.

Impact is absorbed by an operation between the second groove 320 and the second protuberance 310 in such a manner as described below. The second protuberance 310 is forcibly engaged with the second groove 320 during normal time, but when impact is exerted on the steering column, the second protuberance 310 is disengaged from the second groove 320 so that impact is absorbed.

Figure 4A:
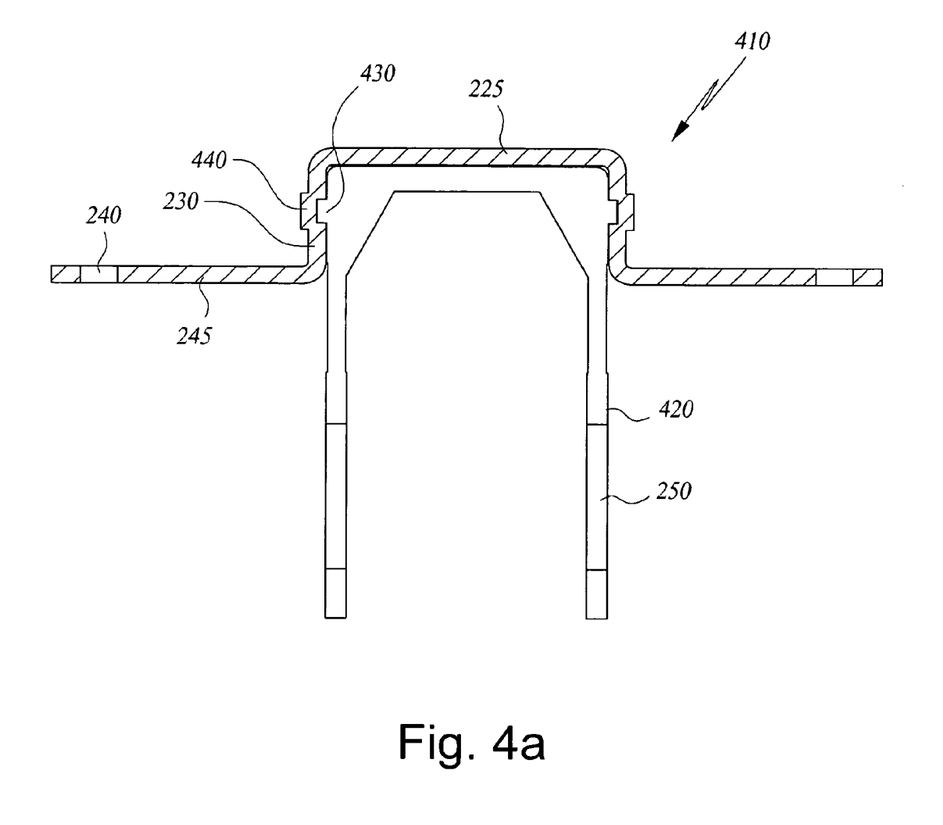
FIG. 4a is a sectional view of a structure where a mounting bracket and a plate bracket according to the fourth and fifth embodiments of the present invention are assembled with each other.

FIG. 4a is a sectional view of a structure where a mounting bracket and a plate bracket according to the fourth embodiment of the present invention are assembled with each other. As shown in FIG. 4a, each third groove 440 is formed at a second mounting bracket 410, and each third protuberance 430 is formed at the second plate bracket 420 (the second mounting bracket 410 and the second plate bracket 420 have the same structure except for the third groove 440 and the third protuberance 430 in comparison with the first mounting bracket 220 and the first plate bracket 210).

Figure 4B:
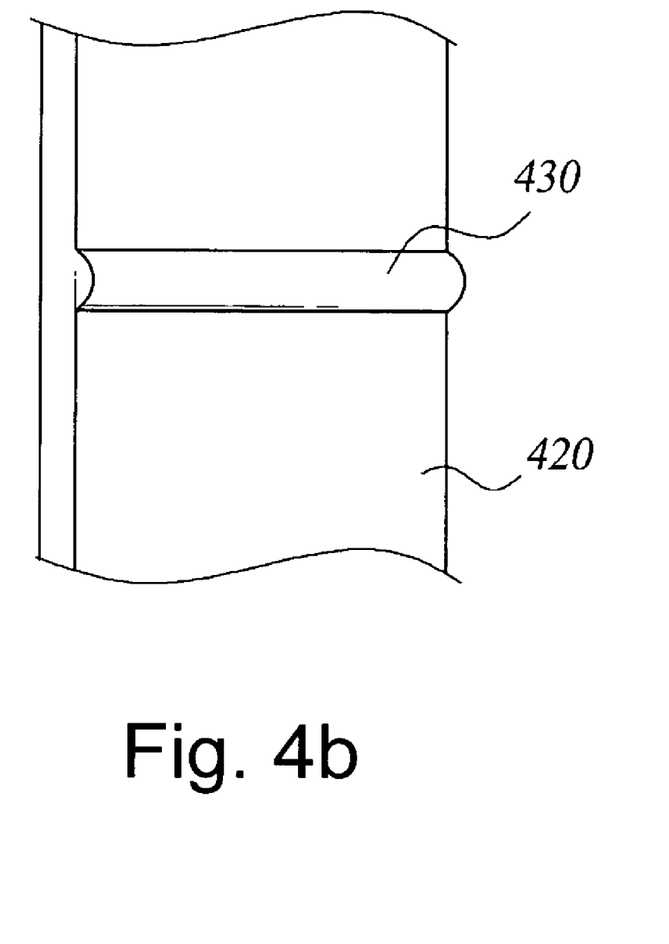
FIG. 4b is a perspective view of a third protuberance formed at a plate bracket according to the fourth and fifth embodiments of the present invention.
Figure 4C:
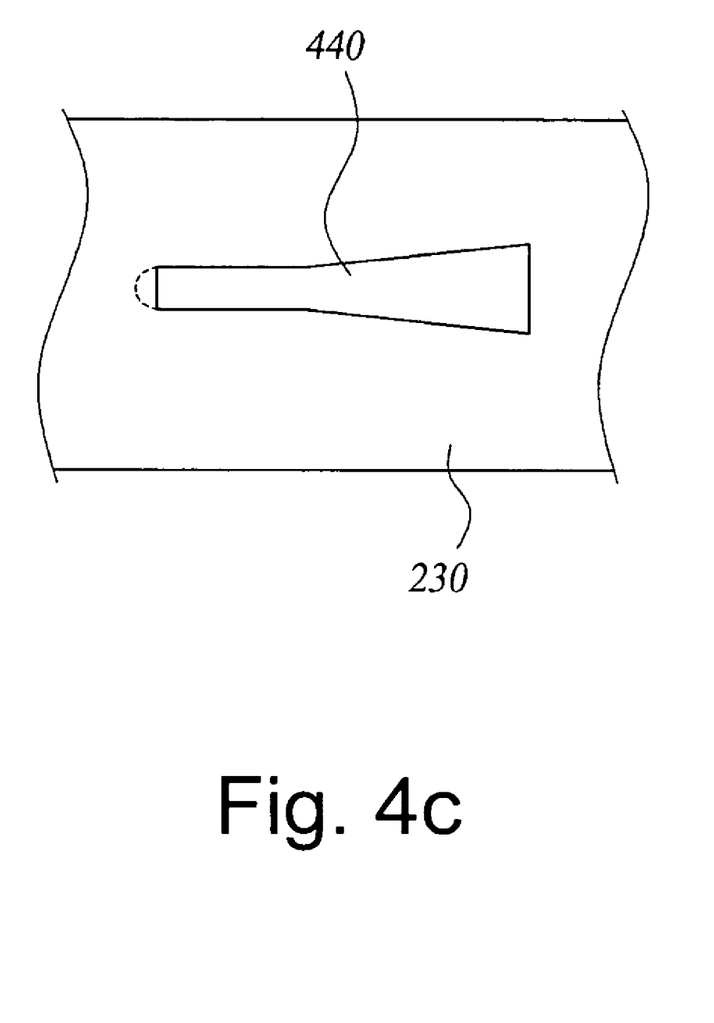
FIG. 4c is a perspective view of a third groove formed at an inner surface of a mounting bracket according to the fourth embodiment of the present invention.
Figure 4D:
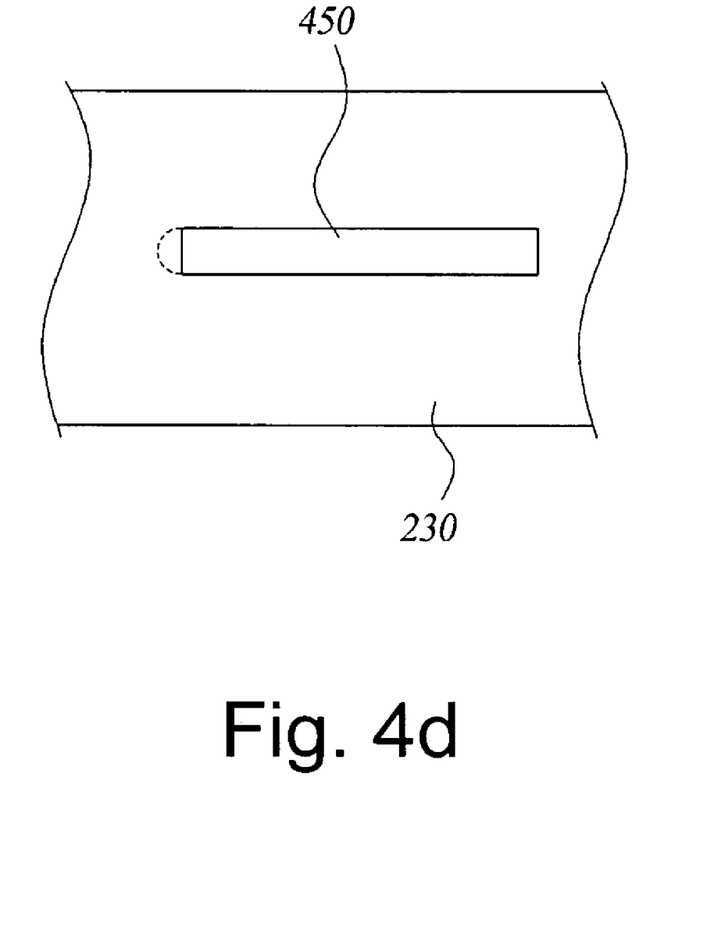
FIG. 4d is a perspective view of a fourth groove formed at an inner surface of a mounting bracket according to the fifth embodiment of the present invention.

FIG. 4b is a perspective view of the third protuberance formed at the plate bracket according to the fourth and fifth embodiments of the present invention, FIG. 4c is a perspective view of the third groove formed at an inner surface of a mounting bracket according to the fourth embodiment of the present invention, and FIG. 4d is a perspective view illustrating a fourth groove formed at an inner surface of a mounting bracket according to the fifth embodiment of the present invention. As shown in FIGS. 4b, 4c, and 4d, the third protuberance 430 is formed at both sides of the second plate bracket 420, and each third groove 440 or each fourth groove 450 is formed at each inner surface of the guide part 230 of the second mounting bracket 410 in such a manner that each groove corresponds to each third protuberance 430.

The third protuberance 430 formed at each end of both sides of the second plate bracket 420 is forcibly engaged with the third groove 440 or the fourth groove 450 formed at the second mounting bracket 410 so that the third protuberance 430 absorbs the load due to collision while moving along the third groove 440 or the fourth groove 450 when the steering column collapses. Therefore, it is preferable that the width of third protuberance 430 is necessarily larger than the minimized width of the third groove 440 or the width of the fourth groove 450 (i.e. in order to absorb the load due to collision, the minimized width of the third groove 440 or the width of the fourth groove 450 has to be smaller than the width of the third protuberance 430).

In the third embodiment of the present invention, the third groove 440 formed at the second mounting bracket 410 has a shape formed in such a manner that a part having a uniform width and a predetermined depth is continuously formed, and then the width thereof increases. This shape makes it possible for the third protuberance 430 to successively absorb the load due to collision while moving along the part having a uniform width of the third groove 440, and after escaping from the part having a uniform width, the third protuberance 430 freely moves so as to allow collapse to be smoothly achieved.

Also, as shown in the fifth embodiment of the present invention, it is also possible that the width of the fourth groove 450 may be uniformly formed from one side to the other side. In a case where the fourth groove 450 having such a shape is formed, when the steering column collapses, the third protuberance 430 successively absorbs the load due to collision while moving along the fourth groove 450.

In order to allow the third protuberance 430 to be smoothly disengaged with the third groove 440 or the fourth groove 450 after absorbing the load due to collision when the steering column collapses, it is preferable that the third groove 440 and the fourth groove 450 have a shape of which the depth decreases more and more from one side toward the other side thereof.

Although, in the embodiment of the present invention, each sectional shape of the first groove 270, the second groove 320, the third groove 440, and the first protuberance 260, the second protuberance 310, and the third protuberance 430 is a semi-circular shape, they are not limited to this shape. Therefore, each shape of them may be various shapes, such as a rectangular shape, a trapezoid shape, etc., if each protuberance can be forcibly engaged with each groove.

Figure 5A:
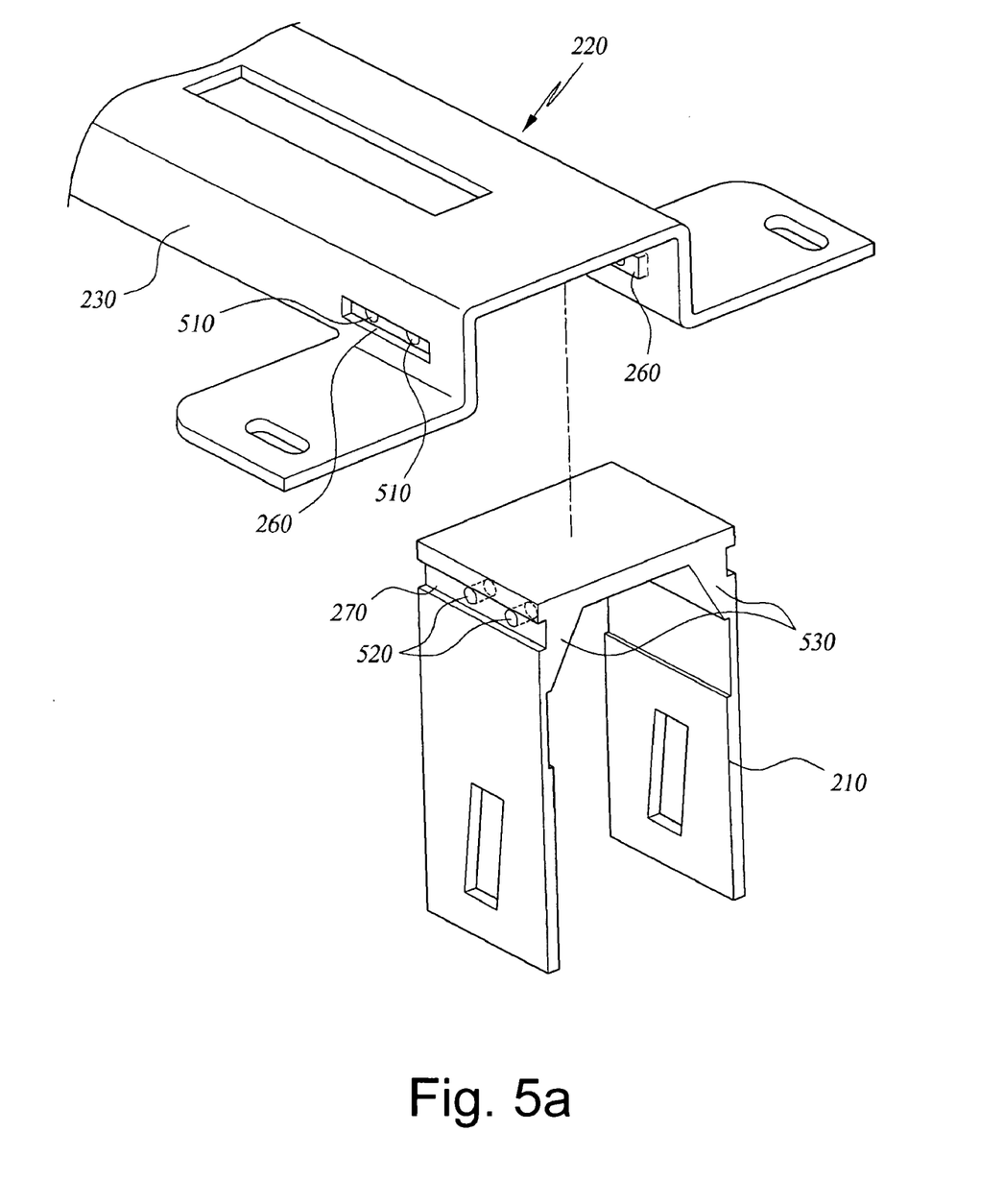
FIG. 5a is a exploded perspective view an assembly where a mounting bracket having a first molding groove formed thereon and a plate bracket having a second molding groove formed thereon according to the embodiment of the present invention are assembled with each other.
Figure 5B:
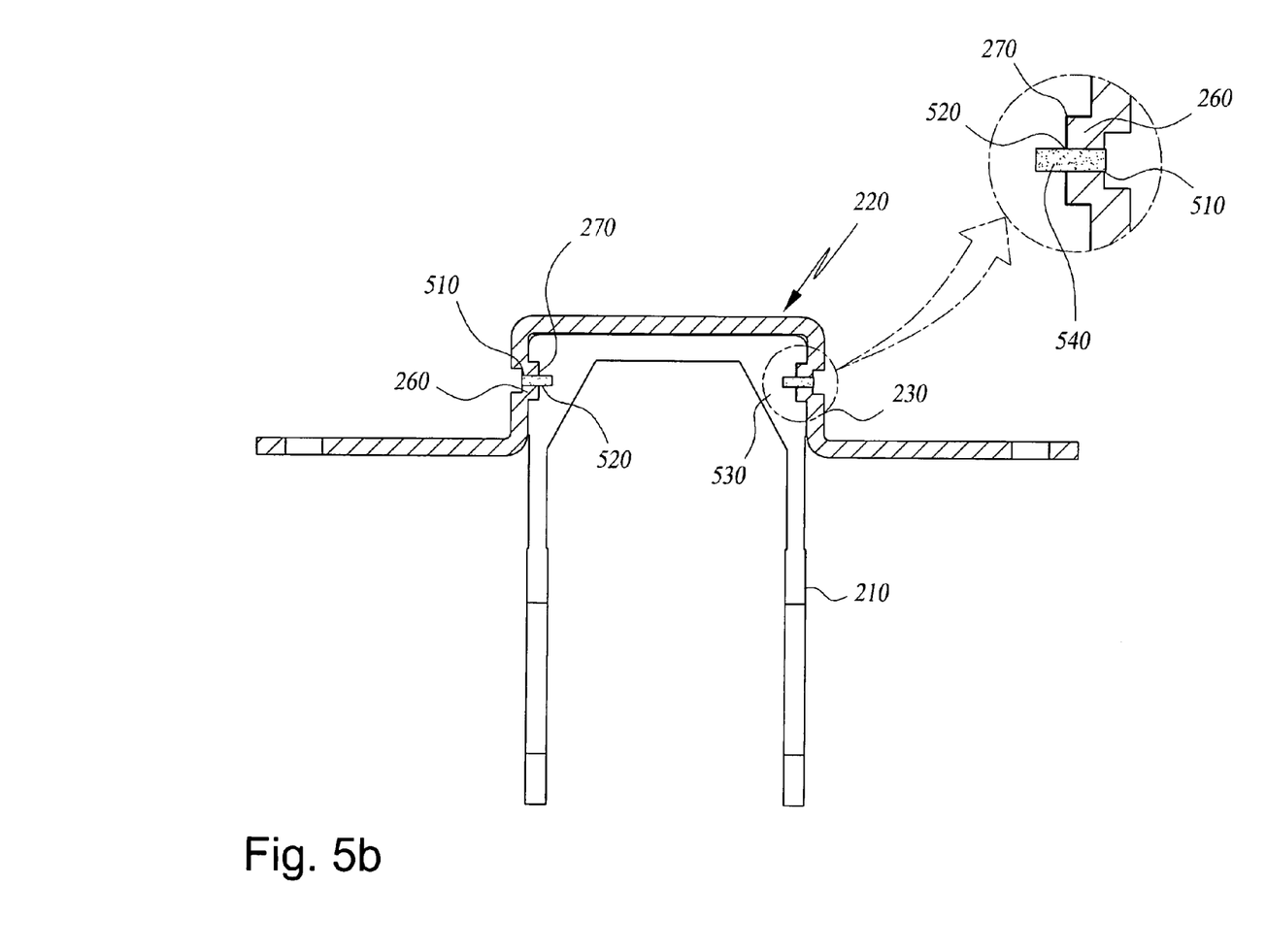
FIG. 5b is a sectional view of a structure where a mounting bracket and a plate bracket according to the sixth embodiment of the present invention are assembled with each other.

FIG. 5a is an exploded perspective view of an assembly where a mounting bracket having a first molding groove formed thereon and a plate bracket having a second molding groove formed thereon according to the embodiment of the present invention are assembled with each other, and FIG. 5b is a sectional view illustrating a structure where a mounting bracket and a plate bracket according to the sixth embodiment of the present invention are assembled with each other.

As shown in FIGS. 5a and 5b, according to the present invention, at least one first molding groove 510 is formed at the protuberance 260, and at least one second molding groove 520 is formed at the first groove 270. In a state where the mounting bracket 220 and the plate bracket 210 are forcibly assembled with each other, a molding member 540 is molded in the first molding groove 510 and the second molding groove 520.

The protuberance 260 is formed at the guide part 230 of the mounting bracket 220 in a longitudinal direction of the guide part 230, and has a shape protruding toward an inner side of the first mounting bracket 220.

The sectional shape of the protuberance 260 may be an oblong-shape, but it is not necessary that the sectional shape is limited to this shape. Therefore, it may be a semi-circular shape, etc.

It is preferable that the first molding groove 510 extends through the protuberance 260.

Particularly, the first molding groove 510 is formed at an inner side of the protuberance 260 in such a manner that the first molding groove 510 is arranged in a longitudinal direction of the protuberance 260 while extending through the protuberance 260.

Although it is illustrated in FIG. 5a that the number of first molding grooves 510 is two, it is not necessary that the number thereof is limited to two. Therefore, it is possible that the number of first molding grooves is one or more than three according to fastening force required between the protuberance 260 and the first groove 270.

Also, according to the number of the first molding grooves 510 which are formed, each number of second molding grooves 520 and third molding grooves 610 (see FIG. 6), which are formed at the first plate bracket 210, is determined.

Also, the first molding groove 510 may be formed while having a hole-shape as shown in FIG. 5a, and also be formed while having a slot-shape.

Particularly, it is also possible that a slot having a width smaller the width of the protuberance 260 is formed along an inner side of the protuberance 260, and corresponding to the slot, a slot having a recess-shape of which width smaller than the width of the first groove 270 is formed at the first groove 270 along an inner side thereof so that molding member can be molded therein.

The first groove 270 is formed at each end of both sides of the plate bracket 210, and the second molding groove 520 is formed in such a manner that the second molding groove 520 corresponds to the first molding groove 510 when the plate bracket 210 is assembled with the mounting bracket 220.

The second molding groove 520 can be formed in such a manner that it reaches an inner part of a corner part 530 of the plate bracket 210, and can be also formed in such a manner that it extends through the corner part 530.

In a case where the second molding groove 520 extends through the corner part 530 of the plate bracket 210, when the molding member 540 is molded, the molding member 540 is filled while extending through the corner part 530. Therefore, the amount of absorbed load due to collision in the above case increases in comparison with a case where the molding member is filled while reaching only an inner part of the corner part 530, but the amount of the molding member 540 to be filled also increases.

Figure 6:
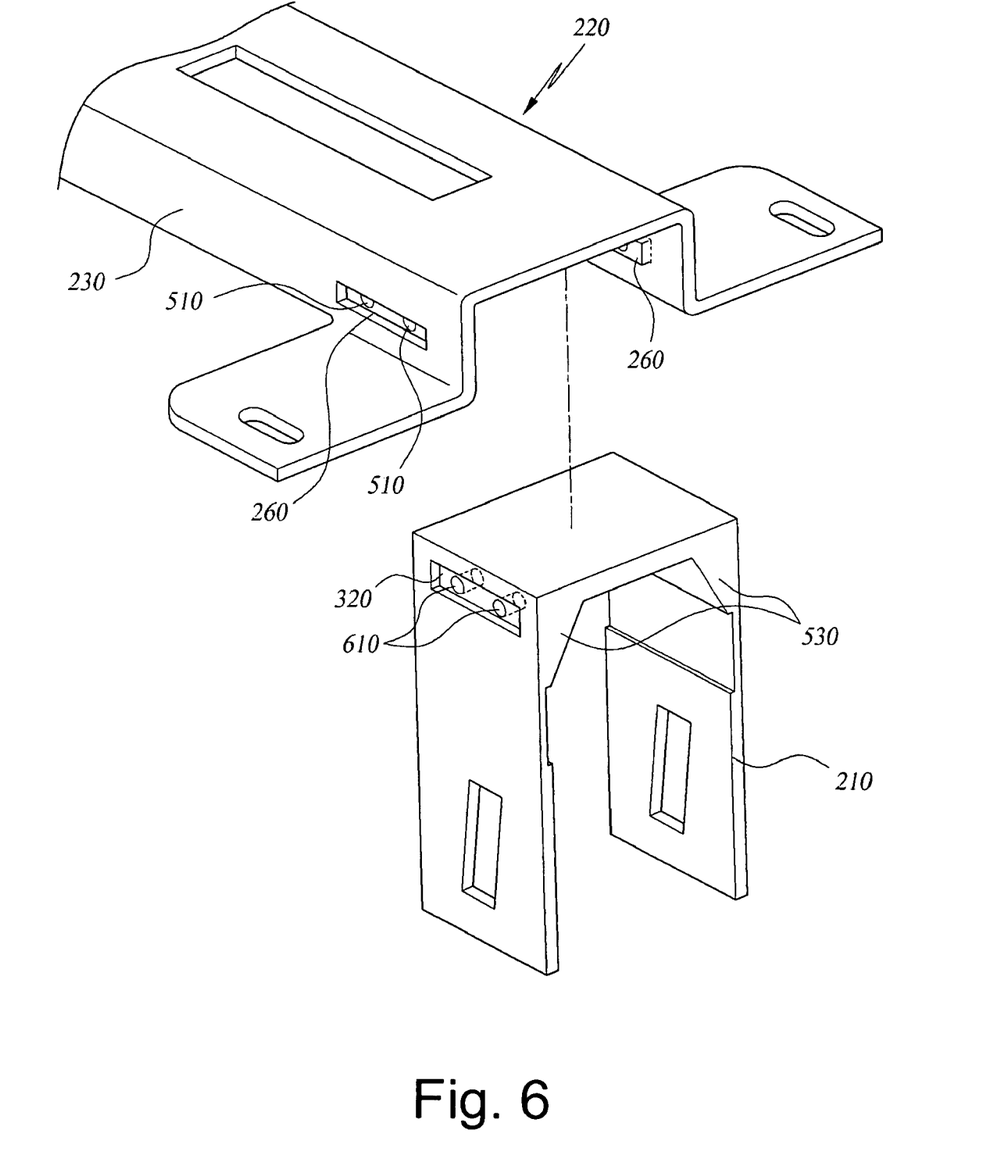
FIG. 6 is an exploded perspective view of an assembly where a mounting bracket having a first molding groove formed thereon and a plate bracket having a third molding groove formed thereon according to the seventh embodiment of the present invention are assembled with each other.

FIG. 6 is an exploded perspective view of the mounting bracket having the first molding groove formed thereon and the plate bracket having the third molding groove formed thereon according to the seventh embodiment of the present invention are assembled with each other. As shown in FIG. 6, the second groove 320 has a length smaller than the width of the first plate bracket 210 (the length properly corresponding to the length of the protuberance 260 of the mounting bracket 220). The third molding groove 610 is formed in such a manner that it corresponds to the first molding groove 510 when the plate bracket 210 and the mounting bracket 220 are assembled with each other.

The shape, number, etc. of the third molding groove 610 may be the same as the second molding groove 520 as shown in FIGS. 5a and 5b. Therefore, the description of the third molding groove 610 will be omitted.

As the impact absorption steering apparatus according to the present invention, an embodiment where a protuberance is formed at a plate bracket 210 and a guide part 230 is formed at a mounting bracket 220 has been mentioned. Therefore, it is possible in such an embodiment that a molding groove is formed while extending through the protuberance and the groove and then a molding member can be molded therein.

It is preferable that material of the molding member 540 is reinforced plastic, but it is not necessary that the material is limited to reinforced plastics.

Particularly, if a certain material can be molded in the molding groove so as to increase the amount of absorbed load between the protuberance 260, the first groove 270, and the second groove 320, the certain material may be one selected from large variety of material such as epoxy, polycarbonate, etc.

According to the present invention as described above, a groove or a protuberance is formed at a mounting bracket and a plate bracket, respectively, instead of a capsule and a tearing plate which have been used as an impact absorption device of a conventional steering column and then the protuberance is forcibly engaged with the groove so as to be fixed therein so that when impact energy is applied to the steering column, and load due to collision is absorbed by relative movement between the groove and the protuberance. Therefore, manufacturing cost can be lower and manufacturing processes can be reduced.

Also, according the present invention described above, at least one molding groove is formed at a protuberance formed at an inner surface of a guide part of a mounting bracket, and at least one molding groove is formed at a groove formed at each end of both sides of the plate bracket in such a manner the groove corresponds to the protuberance. Then, a molding member is molded in each molding groove so that the amount of load to be absorbed can increase in comparison with a case where the protuberance is forcibly engaged with the groove.

Although an exemplary embodiment of the present invention has been described for illustrative purposes, those skilled in the art will appreciate that various modifications, additions and substitutions are possible, without departing from the scope and spirit of the invention as disclosed in the accompanying claims. Therefore, the embodiments of the present invention have not been described for limitation of the spirit of the present invention, but for illustrative purposes. Accordingly, the scope of the invention is not to be limited by the above embodiments but by the claims and the equivalents thereof.

What is claimed is:

1. An impact absorption steering apparatus, comprising:
   a mounting bracket for supporting an outer tube so as to fix the outer tube in a chassis of a vehicle; and
   a plate bracket which has one side open and another side assembled with the mounting bracket, the plate bracket having an inner space surrounding the outer tube, a portion of a major inner side of the mounting bracket engaging a portion of a major outer side of the plate bracket;
   at least one protuberance formed at the major inner side of the mounting bracket, the at least one protuberance extending away from the major inner side toward the inner space, and
   at least one groove formed in the major outer side of the plate bracket, the at least one groove receiving the at least one protuberance.

2. The impact absorption steering apparatus as claimed in claim 1, wherein the at least one protuberance has a width larger than a width of the at least one groove.

3. The impact absorption steering apparatus as claimed in claim 1, wherein the at least one protuberance has a shape formed in such a manner that a uniform width and a predetermined length are successively formed, and then the width becomes smaller.

4. An impact absorption steering apparatus, comprising:
   a mounting bracket for supporting an outer tube so as to fix the outer tube in a chassis of a vehicle; and
   a plate bracket which has one open side and another side assembled with the mounting bracket, the plate bracket having an inner space surrounding the outer tube, wherein a portion of a major inner side of the mounting bracket engages with a portion of a major outer side of the plate bracket;
   at least one protuberance formed at the major outer side of the plate bracket, the at least one protuberance extending away from the major outer side and away from the inner space, and
   at least one groove formed in the major inner side of the mounting bracket, the at least one groove receiving the at least one protuberance.

5. The impact absorption steering apparatus as claimed in claim 4, wherein the at least one groove has a width smaller than a width of the at least one protuberance.

6. The impact absorption steering apparatus as claimed in claim 4, wherein the at least one groove has a shape formed in such a manner that a uniform width and a predetermined length is successively formed, and then the width becomes larger.

7. The impact absorption steering apparatus as claimed in claim 1, further comprising at least one first molding groove extending through the at least one protuberance, a second molding groove at the at least one groove and corresponding to the first molding groove, and a molding member filled in the first molding groove and the second molding groove.

8. The impact absorption steering apparatus as claimed in claim 7, wherein the at least one groove has a width smaller than a width of the plate bracket and a length which is longer than or equal to a length of the at least one protuberance of the mounting bracket.

9. The impact absorption steering apparatus as claimed in claim 7, wherein the first molding groove and the second molding groove have a hole-shape.

10. The impact absorption steering apparatus as claimed in claim 7, wherein the first molding groove and the second molding groove have a slot-shape.

11. The impact absorption steering apparatus as claimed in claim 7, wherein the second molding groove is formed in such a manner the second molding groove reaches an inner part of a corner part of the plate bracket.

12. The impact absorption steering apparatus as claimed in claim 7, wherein the second molding groove is formed in such a manner the second molding groove extends through a corner part of the plate bracket.

13. The impact absorption steering apparatus as claimed in claim 1, wherein the mounting bracket and the plate bracket are fixed to each other by only a press-fit between the at least one protuberance and the at least one groove.

14. The impact absorption steering apparatus as claimed in claim 4, wherein the mounting bracket and the plate bracket are fixed to each other by only a press-fit between the at least one protuberance and the at least one groove.

* * * * *